United States Patent
Sedgwick (10) Patent No.: US 9,009,982 B1
(45) Date of Patent: Apr. 21, 2015

(54) DUSTLESS DRYWALL CUTTING TOOL

(71) Applicant: Simon J. Sedgwick, Aurora (CA)

(72) Inventor: Simon J. Sedgwick, Aurora (CA)

( * ) Notice: Subject to any disclaimer, the term of this patent is extended or adjusted under 35 U.S.C. 154(b) by 133 days.

(21) Appl. No.: 13/852,684

(22) Filed: Mar. 28, 2013

Related U.S. Application Data (60) Provisional application No. 61/617,116, filed on Mar. 29, 2012.

(51) Int. Cl.
*B23D 45/16* (2006.01)
*B23Q 11/00* (2006.01)
*B23D 59/00* (2006.01)
*B23D 45/00* (2006.01)

(52) U.S. Cl.
CPC .......... *B23Q 11/0071* (2013.01); *B23D 59/006* (2013.01); *B23D 45/003* (2013.01)

(58) Field of Classification Search
CPC ...... B23D 45/003; B23D 45/16; B23D 59/06; B23D 59/006; B23Q 11/0071
USPC ........... 30/124, 388–391; 125/13.01; 451/451
See application file for complete search history.

(56) References Cited

U.S. PATENT DOCUMENTS

| | | | | |
|---|---|---|---|---|
| 1,806,582 A * | 5/1931 | Beutner | ............................ | 30/390 |
| 1,833,785 A * | 11/1931 | Krieger | ............................... | 83/98 |
| 2,617,186 A * | 11/1952 | Pickles | ............................ | 30/144 |
| 2,973,576 A * | 3/1961 | Hentke | ............................. | 30/92 |
| 3,468,350 A * | 9/1969 | Logan | .............................. | 30/377 |
| 3,481,036 A * | 12/1969 | Slaughter | ......................... | 30/124 |
| 3,730,239 A * | 5/1973 | Kaman et al. | .................... | 30/391 |
| 3,802,080 A * | 4/1974 | Peter | ................................. | 30/377 |
| 4,022,182 A * | 5/1977 | Lenkevich | .................. | 125/13.01 |
| 4,422,239 A * | 12/1983 | Maier et al. | ...................... | 30/124 |
| 4,972,588 A * | 11/1990 | Briach, Sr. | ....................... | 30/388 |
| 5,074,044 A * | 12/1991 | Duncan et al. | .................. | 30/124 |
| 5,084,972 A | 2/1992 | Waugh | | |
| 5,349,752 A * | 9/1994 | Stirm | .............................. | 30/124 |
| 5,440,809 A | 8/1995 | Padilla | | |
| 5,540,210 A * | 7/1996 | Jones | .......................... | 125/13.01 |
| 5,588,213 A * | 12/1996 | Swanberg | ........................ | 30/124 |
| 5,653,033 A * | 8/1997 | McDowell | ....................... | 30/390 |
| 6,047,693 A | 4/2000 | Yamami et al. | | |
| 6,108,912 A * | 8/2000 | Radigan | .......................... | 30/124 |
| 6,212,778 B1 * | 4/2001 | Carter | .......................... | 30/136.5 |
| 6,219,922 B1 * | 4/2001 | Campbell et al. | ................ | 30/124 |
| 6,514,131 B1 | 2/2003 | Reich et al. | | |
| 6,735,875 B1 * | 5/2004 | Eslambolchi et al. | ........... | 30/377 |
| 6,896,604 B1 | 5/2005 | Taylor et al. | | |
| 6,935,939 B1 * | 8/2005 | Buser et al. | .................... | 451/451 |
| 7,300,339 B2 * | 11/2007 | Gaul et al. | ..................... | 451/451 |
| 7,526,866 B2 * | 5/2009 | Schnell et al. | ................... | 30/124 |
| 7,596,872 B2 * | 10/2009 | Clarke et al. | ................... | 30/391 |
| 8,181,350 B1 * | 5/2012 | Morin | .............................. | 30/90.4 |
| 2006/0169111 A1 * | 8/2006 | Kozlowski | ........................ | 83/13 |
| 2008/0244910 A1 * | 10/2008 | Patel | ............................... | 30/123 |

(Continued)

*Primary Examiner* — Hwei C Payer
(74) *Attorney, Agent, or Firm* — Robert C. Montgomery; Montgomery Patent & Design, LP (57) ABSTRACT

A drywall-cutting tool comprises a rotary blade of a thin design that cuts a very small kerf resulting in a smooth cut as well as a small amount of dust. Any dust that is generated is immediately vacuumed away by an on-board vacuum system that collects the dust in a removable dust bag. Additionally, the saw is provided with an adjustable depth mechanism for the most common thicknesses of drywall. This feature allows for accurate cuts, especially in remodeling scenarios where drywall must be cut without damaging other building components behind the drywall.

10 Claims, 5 Drawing Sheets

(56) References Cited

U.S. PATENT DOCUMENTS

2010/0170538 A1* 7/2010 Baker et al. .................... 134/18
2010/0269353 A1* 10/2010 Martin ........................... 30/124
2011/0079207 A1 4/2011 Guth

* cited by examiner

DUSTLESS DRYWALL CUTTING TOOL

RELATED APPLICATIONS

The present invention was first described in and claims the benefit of U.S. Provisional Patent Application No. 61/617,116 filed on Mar. 29, 2012, the entire disclosures of which are incorporated herein by reference.

FIELD OF THE INVENTION

The present invention relates to a drywall-cutting tool to minimize the amount of airborne dust by directing and trapping it in a collection bag attached to the device.

BACKGROUND OF THE INVENTION

Drywall is perhaps the most common interior wall surface used in the world today. It is easy to work with, low-cost, and looks great when finished. During new work, drywall is easily cut with a straight blade knife prior to installation in a quick and relatively dust-free manner. However, there are many instances where new drywall must be cut around obstacles or existing drywall must be cut during remodeling operations. This is most typically done with a jigsaw or saws-all, which gets the work done, but results in a rough cut and a high amount of dust. Additionally, the blades of such tools extend beyond the rear surface of the drywall where they can contact the building structure, wiring, or plumbing with disastrous results. Accordingly, there exists a need for a means by which drywall can be easily cut without the disadvantages as described above. The development of the present invention fulfills this need.

Prior art in this field consists of dust abatement means that render the cutting device unwieldy. Furthermore, prior art dust abatement means either consists of a specific configuration of a dust passage to generate a vortex or an elaborate vacuum system with ducts and hoods. Only elaborate vacuum systems provide an adequate filtration system to collect small particulate matter, whereas other dust collection means are not so efficient in doing so. It is an object of this invention to provide a cutting tool to make finer and more accurate cuts by way of employing thinner cutting apparatuses and an adjustment depth means. Finer cuts result in finer particulates, which require enhanced filtration and collection systems. It is a further object of this invention to provide an effective means of collecting and trapping finer particulates. It is a further object of this invention to have a cutting device that employs both a vortex generating dust collection configuration and a forced air dust collection apparatus. The employment of these methods should not compromise the compactness and portability of the device.

SUMMARY OF THE INVENTION

The device comprises a housing having a working end, a handle, an electric motor, electrical supply source, a drive conversion system, an adjustable depth guide, an auxiliary handle, and a dust collection system. The housing contains the various electrical and mechanical components of the device. Extending from the housing is a handle, which contains the electrical supply source for the electrical components. The housing is further provided with an aperture to receive an auxiliary handle to assist a user in obtaining leverage when employing the device. The handle is further provided with a control switch that is in electro-mechanical connection with the various components of the device. The drive conversion system comprises a gearing and shaft assembly in electro-mechanical connection with the electric motor to convert electrical energy to rotary motion and transmit torque to a working end of the device. This torque is employed to impart a rotary force onto a removably and interchangeable circular blade of the device. The device is also equipped with a guard positioned to substantially envelope the circular blade. An area defined as a space between the circular blade and the guard forms a dust passage.

The dust collection system comprises a fan mounted onto the guard, and is positioned to be directed into the dust passage. This fan generates forced air to drive dust through the dust passage and into an outlet port of the guard. The guard is further provided with a downwardly extending lip located on an inside surface, and is situated just below the outlet port. This lip serves to obviate dust particles from escaping the dust passage. The dust collection system further comprises a dust collection bag. This bag is removably connected to an outside surface of the outlet port. The bag is semi-permeable to allow air to permeate but to trap particulate matter. The guard is equipped with an adjustable depth guide for adjusting the depth of the exposed portion of the circular blade that protrudes beyond the guard. A retaining mechanism locks the depth guide at a selectable depth position. The dust collection bag is connected to an outside surface of the outlet port. If desired, the auxiliary handle is removably attached to the housing.

The device is specifically designed to cut drywall. The rotary blade is of a very thin design that cuts a very small kerf. The saw is provided with an adjustable depth mechanism that is pre-set for the most common thicknesses of drywall. These features allow for accurate cuts, especially in remodeling scenarios where drywall must be cut without damaging other building components behind the drywall. This results in not only a smooth cut, but a very small amount of dust as well. However, any dust that is generated is immediately vacuumed away by an on-board vacuum system that collects the dust in a removable dust bag. The cutting edge of the circular blade is engaged with a surface of the material to be cut. As cutting is performed, particulate matter is expelled creating dust. This dust is directed into the dust passage and through the outlet port, which is then directed into the dust collection bag. The use of this device provides the ability to cut drywall in a manner which is not only quick, easy, and effective, but safe and dust-free as well.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

DESCRIPTIVE KEY 10 drywall-cutting tool with dust collector
20 housing
21 working end
22 handle portion
23 battery attachment end
24 handle aperture
31 saw blade
32 battery
33 switch actuator
34 guard cover
35 dust passage
36 spindle
37 outlet port
38 lip
39 intake opening
40 fan
41 fan housing
43 depth guide
44 retaining mechanism
50 dust collection bag
51 neck
52 neck clip
54 bag liner
56 zipper
65 auxiliary handle
70 motor
75 drive conversion means

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a drywall-cutting tool with dust collector (herein referred to as the "apparatus") 10, which provides a means to cut drywall from an existing installation while minimizing the amount of airborne dust from that process by trapping the discarded particles, both gross and fine, in a vacuum collection system contained within the working end 21 and containing said particles in an attached dust collection bag 50.

Figure 1:
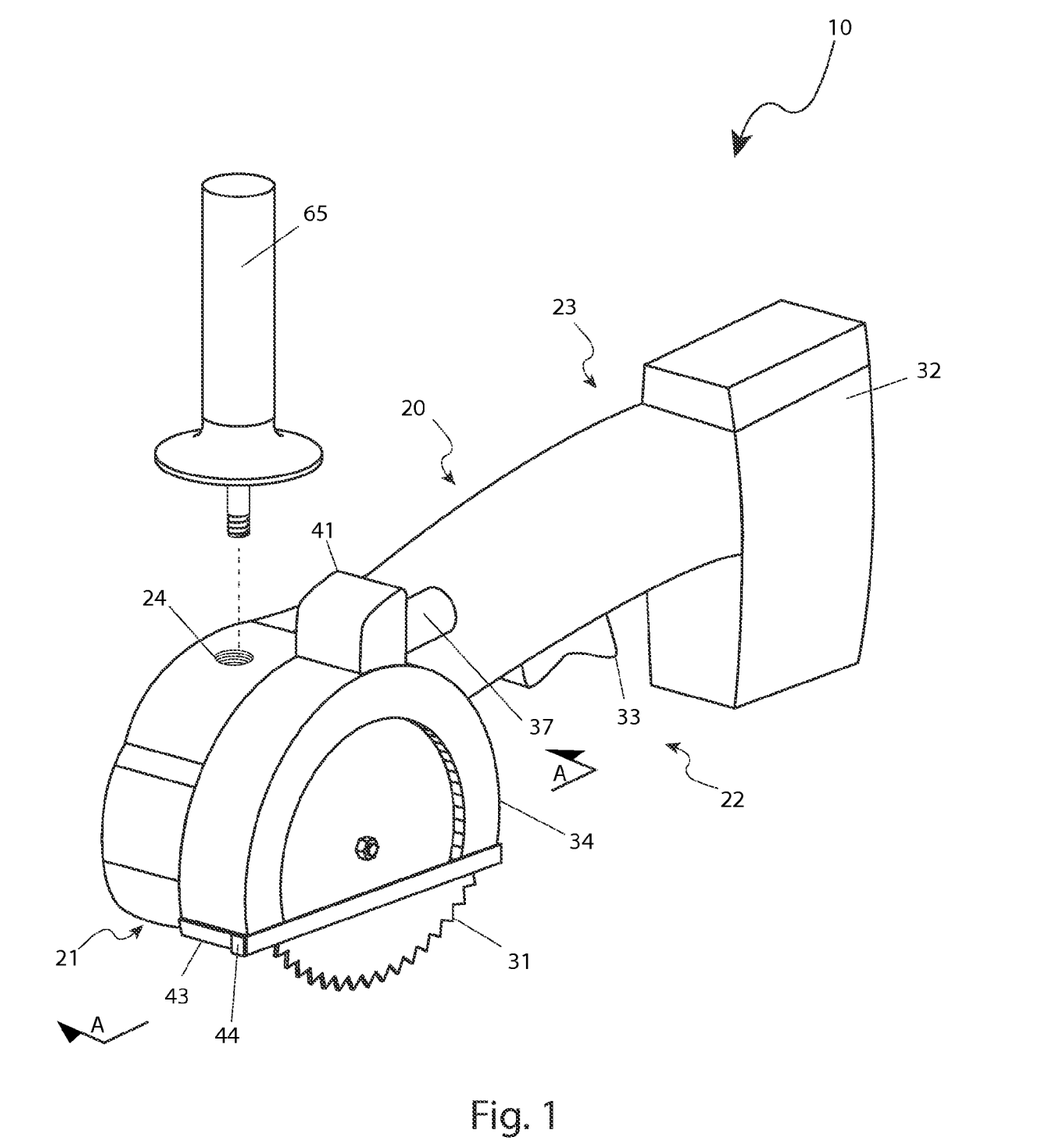
FIG. 1 is a perspective view of a drywall-cutting tool with dust collector 10 in accordance with the preferred embodiment of present invention.

Referring now to FIG. 1, a perspective view of the apparatus 10 according to embodiment of the present invention, is disclosed. The apparatus 10 generally housing 20 having a working end 21, a central handle portion 22, and a battery end 23. The working end 21 includes any of the necessary gears, shafts, and bearings rotary motion of a motor 70 into a drive conversion means 75, such as angle drive necessary for the rotation of a spindle 36 and a fan 40, as well as a saw blade guards and adjustments, and the dust collection system. The drive conversion means 75 may be comprised of a worm and spur gears or a bevel gear set without limiting the invention. A thin, circular, multi-toothed saw blade 31 is mounted on the spindle 36 about a central axis defined by the spindle 36.

A semi-circular guard cover 34 having sidewalls and a flat lower edge is attached to a side of the working end 21 of the housing 20 for at least partially covering an upper portion of the saw blade 31. The area defined between the sides of the saw blade 31 and sidewalls of the guard cover 34 forms a dust passage 35 for collecting and directing particles of material in the direction of the rotation of the saw blade 31. A centrifugal fan 40 is disposed in the sidewall of the working end 21 within the fan housing 41 disposed upon the guard cover 34 for creating a forced flow of air directed toward an outlet port 37 of the guard cover 34. The fan 40 is driven by the motor 70 through the drive conversion means 75 which also comprises an internal transmission assembly. The transmission assembly can be belt-driven or gear-driven mechanisms without limiting the scope of the invention.

The central handle portion 22 houses a portion or all of an internal electric motor 70 which is operationally connected to the spindle 36. The motor 70 is comprised of any of a variety of commercially available, copper wound, low voltage, small frame, direct current motors with a cylindrical output shaft capable of generating sufficient torque to induce the desired motion in the spindle 36.

A battery 32 is connected to the battery attachment end 23 for providing electrical power to the motor 70. The battery 32 is preferably a removable and rechargeable battery pack providing approximately between 12-VDC and 18-VDC power. A momentary-on switch (not shown) is mounted within the handle portion 22 of the apparatus 10 and completes the electrically connection between the battery 32 and the motor 70 by the depression of a spring biased switch actuator 33.

The apparatus 10 also includes a detachable auxiliary handle 65. The auxiliary handle 65, attached in a preferably threaded handle aperture 24, is disposed in the working end 21 of the housing 20. The location of the auxiliary handle 65 can vary depending upon the preferred handing of the user without limiting the scope of the invention.

Figure 2:
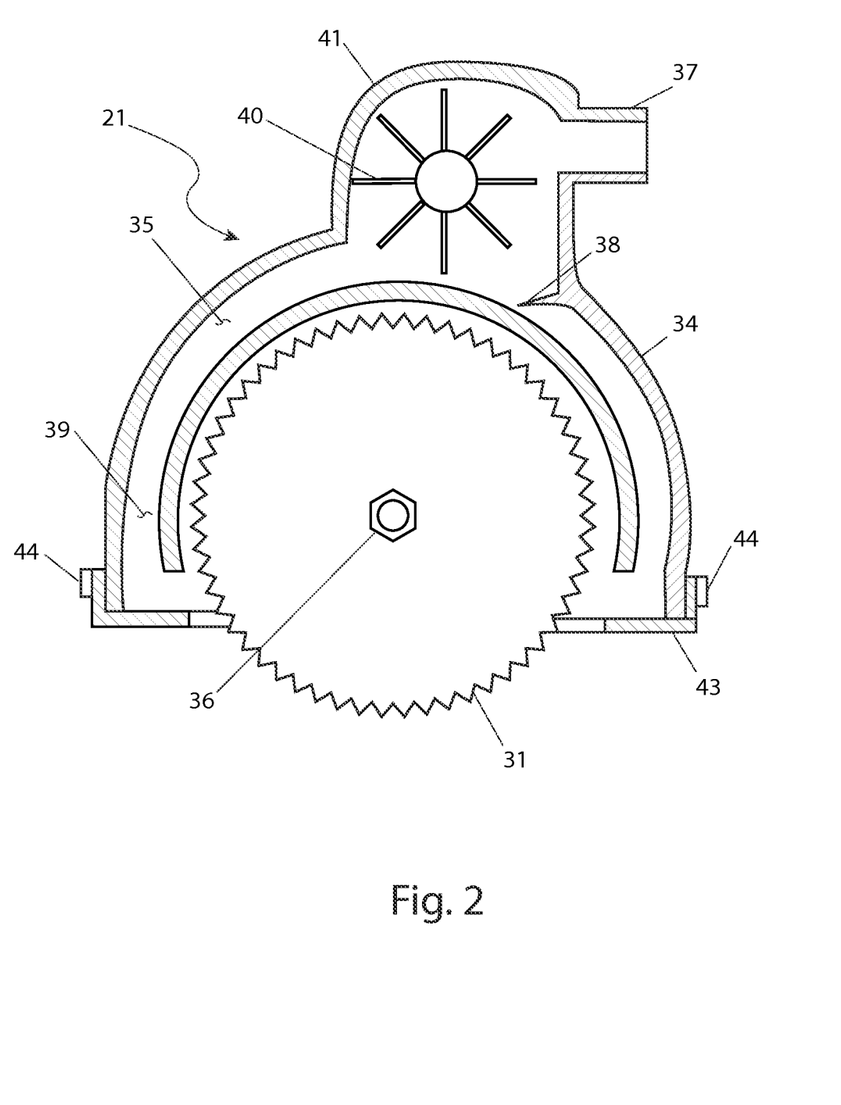
FIG. 2 is a section view along line A-A as seen in FIG. 1 of a working end 21 of the drywall-cutting tool with dust collector 10 in accordance with the preferred embodiment of the present invention.

Referring now to FIG. 2, a cross-section of the apparatus 10, according to the preferred embodiment of the present invention, is disclosed. The fan 40 is disposed within the guard cover 34 aligned between the dust passage 35 and the outlet port 37. A downwardly extending lip 38 is disposed on an inside surface of the guard cover 34 below the outlet port 37 for preventing material particles from escaping from the guard cover 34.

The guard cover 34 also includes an adjustable depth guide 43 for adjusting the depth of the cut. The depth guide 43 is a generally rectangular member having sidewalls, a flat bottom surface, and a central opening for the saw blade 31 to pass through. The depth guide 43 is mounted over the lower edge of the guard cover 34 and can be secured in at least two (2) different positions. A retaining mechanism 44 locks the depth guide 43 at one (1) of the selectable depth positions. The depth guide 43 is adjustable between making one-half inch (½ in.) cuts and five-eighths inch (⅝ in.) cuts. However, it can be appreciated that the depth guide 43 and retaining mechanism 44 can be adapted to be locked into various incremental cutting depths and as such should not be viewed as a limiting factor. The retaining mechanism 44 is preferably comprised of a pair of slide clamps for engaging contact surfaces of the guard cover 34 and the depth guide 43. However, it can be appreciated that the retaining mechanism 44 can be any suitable locking mechanism such as a spring detent pin that engages one (1) of a plurality of detent apertures, a threaded tightening mechanism, or the like.

Figure 3:
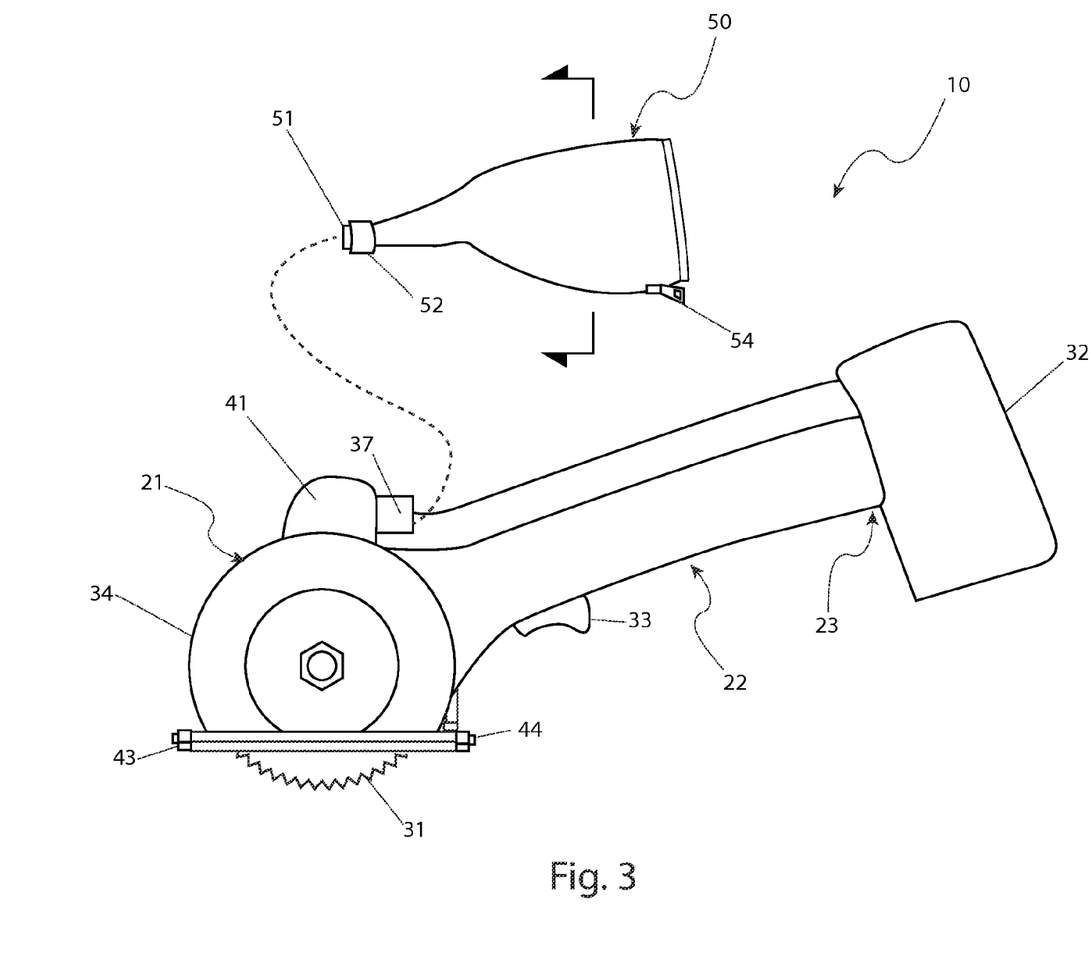
FIG. 3 is a side view of the drywall-cutting tool with dust collector 10 depicted with a special feature 27 in an up position in accordance with the preferred embodiment of the present invention.
Figure 4:
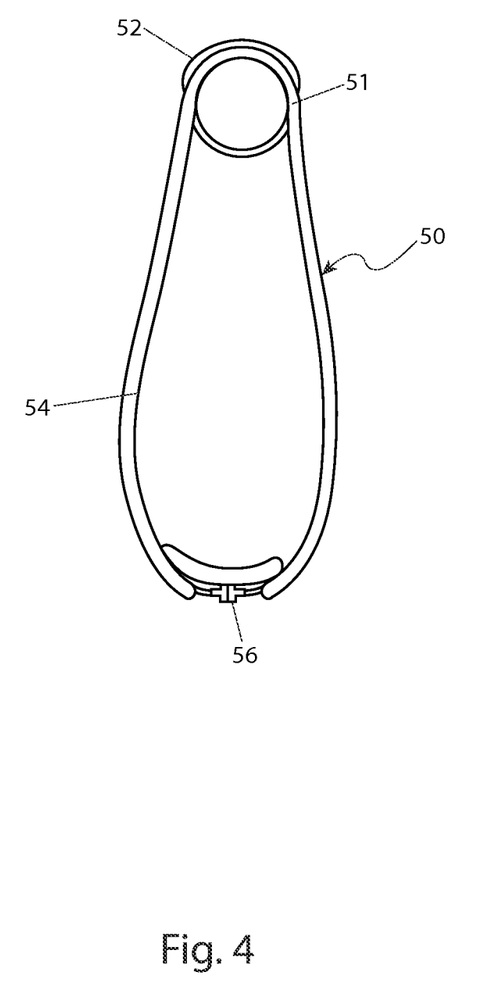
FIG. 4 is a section view along a line B-B as shown on FIG. 3 cut through the dust collection bag 50 of the drywall-cutting tool with dust collector 10 in accordance with the preferred embodiment of the present invention; and, FIG. 5 is a schematic showing the motor 70, drive conversion means 75, spindle 36, and fan 40 in accordance with the preferred embodiment of the present invention.

Referring to FIG. 3, a side view of the apparatus 10, according to the preferred embodiment of the present invention, is disclosed. A dust-collection bag 50 is connectable to the exterior of the outlet port 37. The dust collection bag 50 acts as an air filter and is preferably comprised of a fabric bag having a liner 54 with a fine weave that allows air to pass through but prevents particulate matter from passing. The dust collection bag 50 is further provided with a narrow neck 51 into which a protruding end of the outlet port 37 is inserted, and a zipper 56 which will close off an opening through which the dust may be emptied. A neck clip 52 secures the dust collection bag 50 to the outlet port 37.

Figure 5:
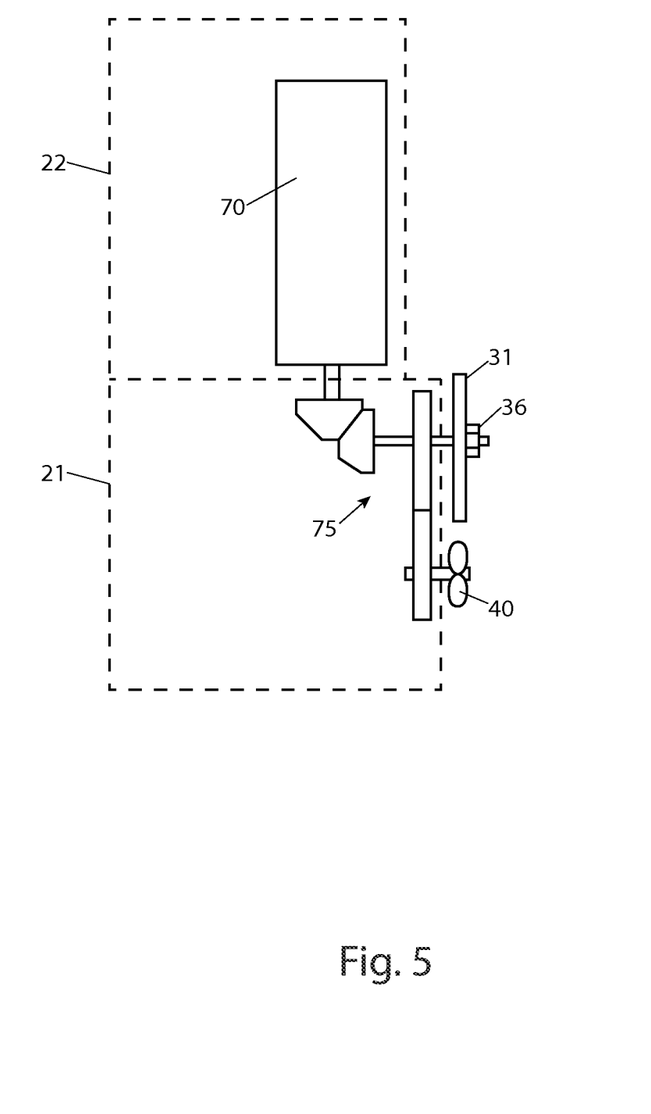

FIG. 5 is a schematic showing the motor 70. The motor 70 is operably connected to the drive conversion means 75. The drive conversion means 75 drives the spindle 36 (and attached saw blade 31) and the fan 40.

The preferred embodiment of the present invention can be utilized by the enabled user in a simple and straightforward manner with little or no training. The method of utilizing the apparatus 10 can be achieved by performing a series of steps. It can be appreciated that the operational steps can be performed in alternative order and as such any operational description of use should not be viewed as a limiting factor.

During operation of the apparatus 10, the depth guide 43 is locked into a selected and desired depth to correspond to the thickness of the drywall to be cut and the depth of the cut. The depth guide 43 is locked into position by use of the retaining mechanism 44. The battery 32 can be charged by use of an external existing battery charger that electrically connects to an AC power source. Once charged, the battery 32 is connected to the apparatus 10 at the battery attachment end 23 of the housing 20. The dust collection bag 50 is connected to the outlet port 37 at the neck 51. If needed, the auxiliary handle 65 can be attached to working end 21 of the housing 20 to give the user a secondary grip during use.

The cutting edge of the saw blade 31 engages the surface of the material to be cut perpendicular to the rotational axis of the blade 31. As the saw blade 31 rotates, the cutting surface cuts or grinds a thin, smooth kerf in the drywall. The dust and particles created by the cutting edge of the blade 31 are directed into the dust passage 35 through the intake opening 39 of the guard cover 34. As the fan 40 rotates, a stream of air is drawn from the air intake opening 39 of the dust passage positioned at a front end of the lower edge of the guard cover 34. The dust and material particles created by the saw blade 31 are directed toward the intake opening 39 where a partial vacuum is created by the pressure drop behind the fan 40. The particles in the airflow are directed through the outlet port 37 and through the neck 51 of the dust collection bag. When the airflow encounters the much larger cross-sectional area of the dust collection bag 50, the velocity of the air rapidly decreases and the dust is deposited in said dust collection bag 50.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A dust collecting drywall cutting tool comprising:
   a housing comprising a working end, a handle portion, and a battery attachment end;
   an electric motor disposed within said housing working end;
   a drive conversion means operably connected to said motor for transmission of power from said motor;
   a saw blade mechanically connected to said drive conversion means;
   a guard cover attachable to a side of said housing working end for at least partially covering an upper portion of said saw blade,
      said guard cover being a semi-circular having sidewalls and a flat lower edge for covering the upper portion of said saw blade; and,
      a dust passage defined between sides of said saw blade and said guard cover sidewalls;
   a depth guide mounted to said guard cover, adjustable to a selectable incremental depth position relative to said saw blade;
   a fan disposed within a fan housing located on said guard cover and mechanically connected to said drive conversion means for creating a vacuum within said dust passage;
   an outlet port in fluid communication with said fan and extending outward from said fan housing adjacent said fan and opposite said dust passage;
   a battery removably connected to said battery attachment end and electrically connected to said motor; and,
   a trigger disposed on said housing handle portion electrically connected between said battery and said motor for energizing said motor when depressed;
   wherein said dust passage collects and directs passage of particles of material produced during use of said tool through said guard cover and through said outlet port; and,
   wherein said guard cover further comprises a lip downwardly extending from an inside surface thereof below said outlet port.

2. The tool of claim 1, wherein said depth guide is a generally rectangular member having sidewalls, a flat bottom surface, and a central opening permitting said saw blade to pass through;
   wherein said depth guide is secured to a lower edge of said guard cover; and,
   wherein a retaining mechanism secures said depth guide at said selectable depth position.

3. The tool of claim 2, wherein said selectable depth position permits said saw blade to perform cuts in the range of and including one-half inch (½ in.) cuts and five-eighths inch (⅝ in.) cuts.

4. The tool of claim 2, wherein said retaining mechanism further comprises a pair of slide clamps.

5. The tool of claim 1, further comprising a dust collecting bag attachable to an outlet of said outlet port.

6. A dust collecting drywall cutting tool comprising:
   a housing comprising a working end, a handle portion, and a battery attachment end;

a side handle removably attached to said housing working end;

an electric motor disposed within said housing working end;

a drive conversion means operably connected to said motor for transmission of power from said motor;

a saw blade mechanically connected to said drive conversion means;

a guard cover attachable to a side of said housing working end for covering at least partially covering an upper portion of said saw blade, said guard cover being a semi-circular having sidewalls and a flat lower edge for covering the upper portion of said saw blade; and, a dust passage defined between sides of said saw blade and said guard cover sidewalls;

a depth guide mounted to said guard cover adjustable to a selectable incremental depth position relative to said saw blade;

a fan disposed within a fan housing located on said guard cover and mechanically connected to said drive conversion means for creating a vacuum within said dust passage;

an outlet port in fluid communication with said fan and extending outward from said fan housing adjacent said fan and opposite said dust passage;

a battery removably connected to said battery attachment end and electrically connected to said motor; and, a trigger disposed on said housing handle portion electrically connected between said battery and said motor for energizing said motor when depressed;

wherein said dust passage collects and directs passage of particles of material produced during use of said tool through said guard cover and through said outlet port; and, wherein said guard cover further comprises a lip downwardly extending from an inside surface thereof below said outlet port.

7. The tool of claim 6, wherein said depth guide is a generally rectangular member having sidewalls, a flat bottom surface, and a central opening permitting said saw blade to pass through;

wherein said depth guide is secured to a lower edge of said guard cover; and, wherein a retaining mechanism secures said depth guide at said selectable depth position.

8. The tool of claim 7, wherein said selectable depth position permits said saw blade to perform cuts in the range of and including one-half inch (½ in.) cuts and five-eighths inch (⅝ in.) cuts.

9. The tool of claim 7, wherein said retaining mechanism further comprises a pair of slide clamps.

10. The tool of claim 6, further comprising a dust collecting bag attachable to an outlet of said outlet port.

* * * * *